(12) United States Patent
Yoshizawa et al.

(10) Patent No.: US 12,034,830 B2
(45) Date of Patent: Jul. 9, 2024

(54) COMMUNICATION SCHEME DETERMINATION APPARATUS, COMMUNICATION SCHEME DETERMINATION METHOD AND PROGRAM

(71) Applicant: NIPPON TELEGRAPH AND TELEPHONE CORPORATION, Tokyo (JP)

(72) Inventors: Kento Yoshizawa, Musashino (JP); Yosuke Fujino, Musashino (JP); Yusuke Asai, Musashino (JP); Daisei Uchida, Musashino (JP); Ryo Miyatake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 383 days.

(21) Appl. No.: 17/624,107

(22) PCT Filed: Jul. 1, 2019

(86) PCT No.: PCT/JP2019/026100
§ 371 (c)(1),
(2) Date: Dec. 30, 2021

(87) PCT Pub. No.: WO2021/001886
PCT Pub. Date: Jan. 7, 2021

(65) Prior Publication Data
US 2022/0353054 A1    Nov. 3, 2022

(51) Int. Cl.
*H04L 7/04* (2006.01)
*H04W 56/00* (2009.01)

(52) U.S. Cl.
CPC ............. *H04L 7/04* (2013.01); *H04W 56/001* (2013.01)

(58) Field of Classification Search
CPC .............................. H04L 7/04; H04W 56/001
See application file for complete search history.

(56) References Cited

U.S. PATENT DOCUMENTS

2007/0206638 A1* 9/2007 Santoru ................. H04L 1/0057

OTHER PUBLICATIONS

ROHM Co., Ltd., IoT Technology Information Site Tech Web, "Sub-GHz radio Basic knowledge of Sub-GHz radio development", https://micro.rohm.com/jp/techweb_iot/knowledge/iot03/s-iot03/02-s-iot03/4370, Aug. 28, 2018.

(Continued)

*Primary Examiner* — Ronald B Abelson
(74) *Attorney, Agent, or Firm* — Harness, Dickey & Pierce, P.L.C.

(57) ABSTRACT

A communication method determination apparatus includes a comparison unit and an instruction unit. The comparison unit obtains a bit string of a portion of a physical header for synchronization from a wireless frame that includes the physical header for synchronization in which information for synchronization in a physical layer is set and a physical data portion in which data of a higher-level layer than the physical layer is set, and compares the obtained bit string with a bit string pattern specific to a communication method targeted for determination. The instruction unit performs communication method determination processing for determining whether or not the communication method targeted for determination is used for the wireless frame, based on a result of comparison. If it is determined that the communication method targeted for determination is not used for the wireless frame, the instruction unit changes the communication method targeted for determination, instructs the comparison unit to newly obtain a bit string of a portion that follows the obtained bit string, from the physical header for synchronization, and to compare the newly obtained bit string with a bit string pattern specific to the post-change (Continued)

communication method targeted for determination, and performs the communication method determination processing again.

8 Claims, 9 Drawing Sheets

(56) References Cited

OTHER PUBLICATIONS

Hideaki Yamamoto et al., IEICE Technical Report, "Investigation and evaluation of high-speed selection of contactless interface", vol. 111, No. 470, pp. 31-36, (2012).

Hideaki Yamamoto et al., IEICE Technical Report, "A proposal on high-speed selection of contactless interface", vol. 111, No. 207, (2011).

* cited by examiner

Fig. 4

| COMMUNICATION METHOD | TRANSFER RATE | NAME AND SETTING VALUE BY STANDARD | | | | SYNC WORD TIME LENGTH |
|---|---|---|---|---|---|---|
| | | PREAMBLE | SYNC WORD | PHY HEADER | PHY PAYLOAD | |
| BROADBAND 7 (IEEE802.15.4g) | 10 kbps | PREAMBLE 01010101......010101 | SFD 1001 0000 0100 1110 (0x904E) | PHR | PAYLOAD | 1.6 ms |
| EnOcean | 125 kbps | PREAMBLE 1010 1010 1010 1010 (0xAAAA) | Synchronization Word 1010 1001 0011 1100 (0xA93C) | Length | DATA | 0.128 ms |
| LoRa | 0.3-5 kbps | PREAMBLE NO DEMODULATION 10 OR MORE SYMBOLS ++++++....++— | 0011 0100 (0x34) | PHDR PHDR_CRC | DATA | 1.6-26.7 ms |

| PHYSICAL HEADER PORTION FOR SYNCHRONIZATION | | | PHYSICAL DATA PORTION | | |
|---|---|---|---|---|---|
| PREAMBLE | SYNC WORD | SFD | PHY HEADER | PHY PAYLOAD (MAC HEADER + MAC PAYLOAD) | FCS |

COMMUNICATION SCHEME DETERMINATION APPARATUS, COMMUNICATION SCHEME DETERMINATION METHOD AND PROGRAM

CROSS-REFERENCE TO RELATED APPLICATIONS

This application is a 371 U.S. National Phase of International Application No. PCT/JP2019/026100 filed on Jul. 1, 2019. The entire disclosure of the above application is incorporated herein by reference.

TECHNICAL FIELD

The present invention relates to a communication method determination apparatus, a communication method determination method, and a program.

BACKGROUND ART

Recent years have seen remarkable development in IoT (Internet of Things)-related markets. Accordingly, IoT-related techniques have been actively studied in a wide range of fields including sensing, communication techniques, and applications. Multi-terminal connectability is known as a characteristic demanded for IoT-oriented communication. In the world of IoT in which everything is connected to the Internet, there is demand for a communication method that realizes simultaneous connection of a large number of devices.

Such IoT-oriented communication has the following characteristics. One of the characteristics is that the communication frequency is very low compared with conventional mobile communication. Another characteristic is that the communication capacity demanded for one device is small. LPWA (Low Power Wide Area) has been garnering attention as a communication method that satisfies such demands. LPWA realizes expansion of the coverage and multiple connection by suppressing the power consumption and extending the communication distance.

Nowadays, various methods such as LoRaWAN (registered trademark), Wi-SUN (registered trademark), EnOcean (registered trademark), SIGFOX (registered trademark), and Wi-Fi HaLow (registered trademark) have been established as specific communication methods that use an unlicensed band, namely a band that does not require a license. The communication protocol is different for each of these communication methods. On the other hand, these communication methods partially share a frequency. In view of the above, if a receiving station that receives wireless frames (also simply referred to as "frames") of different types of communication methods promptly determines which communication method is adopted for each of the received wireless frames, and increases the responsiveness of communication, it is effective for securing the multiple connectivity and suppressing the power consumption in a real environment in which a plurality of communication methods are present.

There are a plurality of LPWA methods that use an unlicensed band. Particularly, with an asynchronous communication protocol, upload communication from a terminal may occur at any timing. In the case of a single wireless system, at least at the time of receiving a frame, determination needs to be performed only on detection of a very event of frame arrival and whether or not a communication method used for transmitting the detected frame is used by the wireless communication system. However, in order to realize a shared GW (gateway) that complies with a plurality of LPWA wireless methods, it is necessary to efficiently perform detection of an event of frame arrival that may occur at any timing, as a matter of course, and to efficiently perform determination on whether or not the communication method used for transmitting the detected frame is one of the communication methods that the shared GW complies with, and it is furthermore necessary to perform demodulation processing of a subsequent payload portion.

FIG. 6 is a diagram showing the structure of a physical layer frame of a wireless signal. The physical layer frame includes a physical header portion for synchronization and a physical data portion. In conventional techniques, a bit string inherent to a communication method included in a physical header portion for synchronization is used for determination on the communication method (for example, see Non-patent Document 1).

The physical header portion for synchronization includes a preamble, a sync word, and an SDF (Start Frame Delimiter). The preamble is a bit string pattern for clock synchronization. A receiving station performs bit synchronization using this preamble signal. In most cases, a preamble is a repetitive signal of 01010101 . . . , for example. The sync word is a bit string pattern of several to several tens of bits for identifying the communication method. The sync word is defined uniquely to the standard of the communication method. The preamble and the sync word are used for performing synchronization when the receiving station receives a physical signal of a wireless frame that arrives mainly at any timing. Synchronization includes processing for adjusting a time (cycle), frequency, and the like to the wireless frame, determining the communication method, and performing analog/digital (AD) conversion. The SFD is a bit string indicating the start of the physical data portion. In other words, the SFD indicates the end of the physical header portion for synchronization.

The physical data portion includes a physical (PHY) header, a physical (PHY) payload, and an FCS (Frame Check Sequence). The PHY header is a header portion of the physical layer frame after detection of the analog signal has been completed in the receiving station and digital sampling has been performed. The PHY header includes information such as the length of the physical data portion (length), the time length of CCA (Clear Channel Assessment), the presence or absence of FCS (Frame Check Sum) and designation of a method of the FCS, and whether or not whitening (multiplying data by a random number and scrambling the data) was performed. The PHY payload is real data. For example, in the case of a TCP (Transmission Control Protocol)/UDP (User Datagram protocol)/IP (Internet Protocol) wireless frame, the PHY payload includes a MAC (Medium Access Control) header and a MAC payload. Furthermore, the MAC payload includes an IP header and an IP payload, and the IP payload includes a TCP/UDP header and a TCP/UDP payload. FCS is used for detection of a data loss and errors.

As described above, the physical header portion for synchronization is used for synchronization processing and communication method detection that are required for performing detection and extracting a signal, while the PHY header of the physical data portion indicates information required for demodulation processing for performing sampling and the like using results of synchronization processing and communication method detection, and extracting the physical data portion.

Note that the structure of the physical layer frame may differ according to a communication method. Examples thereof include a communication method for which the sync word is also used as an SFD. In addition, the names of fields and the presence or absence of information may differ according to a communication method.

FIG. 7 is a diagram of the configuration of a receiving circuit 900 of a conventional receiving station. FIG. 8 is a flowchart of communication method determination processing that is performed by the receiving circuit 900 shown in FIG. 7. A power peak determination unit 902 of the receiving circuit 900 detects receiving of a frame based on wireless power received by an antenna 901. The top of the frame includes a preamble portion. The power peak determination unit 902 detects the power peak of the received frame. If the signal receiving intensity for the power peak is lower than a threshold value, the receiving circuit 900 sleeps for a certain period of time.

On the other hand, if the signal receiving intensity for the power peak is higher than or equal to the threshold value, a preamble detection unit 903 samples bit string data of the preamble from the physical header portion for synchronization of the received frame. A sync word detection unit 904 samples a sync word from the physical header portion for synchronization. An SFD detection unit 905 detects the SFD in the physical header portion for synchronization. The receiving circuit 900 performs determination processing for determining whether or not the preamble and sync word indicate a method-specific pattern of a communication method targeted for determination, and whether or not the SFD has been detected following the method-specific pattern. The method-specific pattern is a bit string pattern that differs for each communication method, and is a portion or the entirety of a subset made up of the preamble and the sync word. If a determination of YES is made in the determination processing, the receiving circuit 900 demodulates a physical data portion that follows the SFD. Specifically, a PHY header demodulation unit 906 demodulates the PHY header included in the physical data portion. A PHY data demodulation unit 907 demodulates the PHY payload using the demodulation result of the PHY header. Note that, if the preamble and the sync word are not those of the communication method targeted for determination, or, if the SFD could not be obtained, the receiving circuit 900 makes a determination of NO in the determination processing, and does not perform processing for receiving the wireless frame.

As described in the above example, when detecting a power peak, a conventional receiving station performs synchronization using the preamble, and, after receiving data up to the SFD or the PHY header, detects a unique word portion (for example, a sync word) characteristic of the communication method from the physical header portion for synchronization. The receiving station determines whether or not the bit string pattern of the detected unique word is a bit string pattern of the communication method targeted for determination. The conventional receiving station sets only one communication method as a determination target for one frame. A determination is suitably performed on a timing at which the receiving station sets a communication method as a determination target and which communication method is set as a determination target. If it is determined, based on a match to a known bit string pattern, that the communication method (used for transmitting the received frame) is a determination target, the receiving station performs demodulation processing on a subsequent payload portion using the communication method. In the case of a mismatch, the receiving station does not or cannot read the bit string of the SFD and the physical data portion that follows the SFD. Specifically, the receiving station continues to attempt determination on whether or not there is a match to a unique word, from the top to the bottom of the arrived wireless frame, and ends the processing without detecting a match.

FIGS. 9 and 10 are diagrams for illustrating operations of a conventional receiving station. FIG. 9 shows an example in which the receiving station cannot normally receive a wireless frame, and FIG. 10 shows an example in which the receiving station can normally receive a wireless frame. The receiving station complies with a plurality of communication methods that include communication methods A and B. A transmission station transmits a wireless frame of the communication method B at any timing. The receiving station first detects arrival of the wireless frame based on the signal receiving intensity for the signal power peak. The receiving station performs an operation of determining a communication method using the bit string pattern of a unique word included in the physical header portion for synchronization of the wireless frame.

Here, as shown in FIG. 9, the receiving station determines whether or not there is a match to a unique word of the communication method A, and the receiving station ends the determination operation without obtaining a determination result of a match at all while receiving the wireless frame. Thus, the receiving station fails in receiving the frame. Due to, for example, not receiving an ACK response from the receiving station when a certain period of time of a receiving window has elapsed after transmitting the wireless frame, the transmission station determines that the wireless frame has not reached the receiving station, and performs retransmission processing and the like. The receiving station performs a communication method determination operation of the communication method B on a wireless frame received next, as shown in FIG. 10, for example. Note that operations of the transmission station if an ACK is not received depends on a communication method.

On the other hand, as shown in FIG. 10, the receiving station determines whether or not there is a match to a unique word of the communication method B based on the physical header portion for synchronization of a wireless frame, arrival of which has been detected, and the receiving station obtains a determination result of a match. The receiving station detects the SFD of the communication method B, and demodulates the physical data portion using the communication method B.

CITATION LIST

Non Patent Literature

[NPL 1] Sub-GHz wireless communication format: frame of physical layer (PHY layer)", [online], Aug. 28, 2018, ROHM Co., Ltd., [retrieved on Jun. 11, 2019], Internet<URL: https://micro.rohm.com/jp/tech-web_iot/knowledge/iot03/s-iot03/02-s-iot03/4370>

SUMMARY OF THE INVENTION

Technical Problem

In terminal-initiative LPWA communication, upload communication from a terminal may occur at any timing. However, as described above, a conventional receiving station attempts detection of a preamble and detection of a sync word of one communication method, at a stage before a PHY header. Therefore, there have been cases where the receiving station such as a GW shared by terminals of a plurality of LPWA methods cannot determine the communication method of a wireless frame that may arrive at any timing, and cannot normally receive the wireless frame.

In view of the foregoing, the present invention aims to provide a communication method determination apparatus, a communication method determination method, and a program that can efficiently determine a communication method used for a received wireless frame.

Means for Solving the Problem

One aspect of the present invention is directed to a communication method determination apparatus including: a comparison unit configured to obtain a bit string of a portion of a physical header for synchronization from a wireless frame that includes the physical header for synchronization in which information for synchronization in a physical layer is set and a physical data portion in which data of a higher-level layer than the physical layer is set, and compare the obtained bit string with a bit string pattern specific to a communication method targeted for determination; and an instruction unit configured to perform communication method determination processing for determining whether or not the communication method targeted for determination is used for the wireless frame, based on a result of comparison performed by the comparison unit, and if it is determined in the communication method determination processing that the communication method targeted for determination is not used for the wireless frame, change the communication method targeted for determination to another communication method, instruct the comparison unit to newly obtain a bit string of a portion that follows the obtained bit string, from the physical header for synchronization of the wireless frame, and to compare the newly obtained bit string with a bit string pattern specific to the post-change communication method targeted for determination, and perform the communication method determination processing again.

Another aspect of the present invention directed to a communication method determination method including a comparison step of obtaining a bit string of a portion of a physical header for synchronization from a wireless frame that includes the physical header for synchronization in which information for synchronization in a physical layer is set and a physical data portion in which data of a higher-level layer than the physical layer is set, and comparing the obtained bit string with a bit string pattern specific to a communication method targeted for determination; a communication method determination step of determining whether or not the communication method targeted for determination is used for the wireless frame, based on a result of comparison performed in the comparison step; and an instruction step of, if it is determined in the communication method determination step that the communication method targeted for determination is not used for the wireless frame, changing the communication method targeted for determination to another communication method, giving an instruction to newly obtain a bit string of a portion that follows the bit string obtained in the comparison step, from the physical header for synchronization of the wireless frame, and to compare the newly obtained bit string with a bit string pattern specific to the post-change communication method targeted for determination, and performing communication method determination step again.

Another aspect of the present invention is directed to a program for causing a computer to function as the above-described communication method determination apparatus.

Effects of the Invention

According to the present invention, it is possible to efficiently determine a communication method used for a received wireless frame.

BRIEF DESCRIPTION OF DRAWINGS

FIG. 4 is a diagram showing the specifications of communication methods.

DESCRIPTION OF EMBODIMENTS

Embodiments of the present invention will be described below in detail with reference to the drawings. The embodiments mainly relate to receiving control of a gateway (GW) that is shared by a plurality of IoT-oriented wireless LPWA communication methods.

Figure 1:
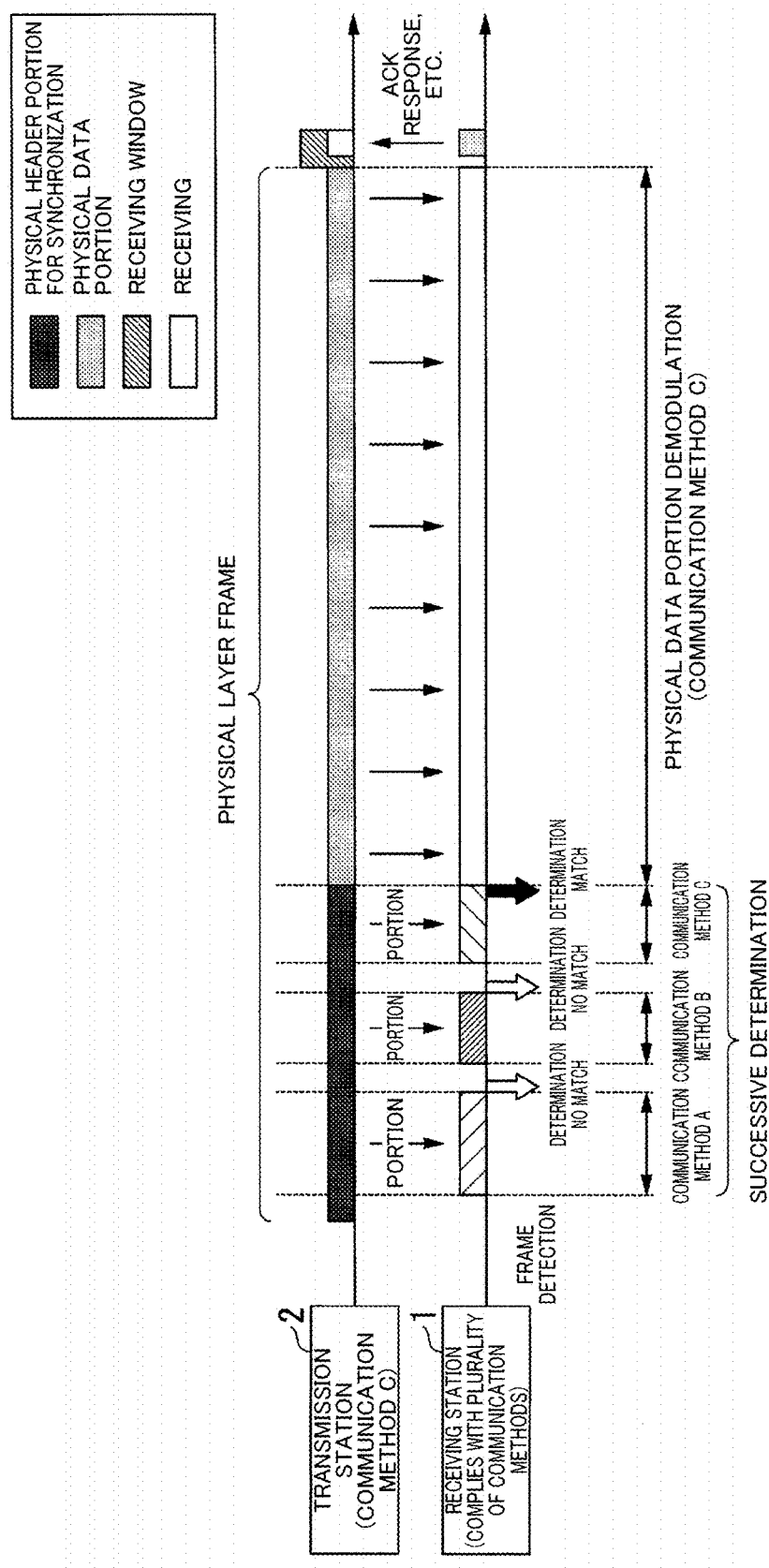
FIG. 1 is a diagram for illustrating operations of a receiving station according to an embodiment of the present invention.

FIG. 1 is a diagram for illustrating operations of a receiving station 1 according to an embodiment of the present invention. The receiving station 1 complies with a plurality of communication methods. The receiving station 1 wirelessly communicates with one or more transmission stations 2. A wireless frame that is transmitted from a transmission station 2 has the physical layer frame structure shown in FIG. 6. Specifically, the wireless frame includes a physical header for synchronization in which information for synchronization in a physical layer is set and a physical data portion in which data of a higher-level layer than the physical layer is set.

A LPWA chip that complies with a plurality of communication methods is used as a receiving circuit of the receiving station 1, for example. While one communication method is being operated, a conventional LPWA chip, which complies with a plurality of communication methods, only performs detection and demodulation for that communication method. Thus, in a situation where there are a plurality of candidates for the communication method of a wireless frame that arrives at any timing, the conventional LPWA chip is not capable of normally receiving a wireless frame whose communication method is different from the communication method that is being operated, even if the LPWA chip complies with the communication method.

LPWA communication has a characteristic that a physical header portion for synchronization of a physical layer frame is designed to be relatively long. Therefore, in a communication environment in which the signal level for noise is high, and the like, it is envisioned that a determination can be sufficiently performed on a communication method without needing to perform determination processing on the entire physical header portion for synchronization. The receiving station 1 according to this embodiment infers a communication method by successively attempting determination on whether or not there is a match to method-specific patterns of a plurality of communication methods, on the physical header for synchronization of a single physical layer frame, taking advantage of the characteristics of the design of the physical layer frame. A method-specific pattern represents a bit string of the entirety or a portion of a preamble and a sync word, and includes a bit string pattern of a unique word specific to the communication method.

Specifically, when a wireless frame that arrives at any timing is detected through power detection or the like, the receiving station 1 successively performs a search from the top of the physical header portion for synchronization of the single physical layer frame, for a plurality of communication methods, using the characteristics of the header designs of the physical header portions for synchronization of the communication methods. A method-specific pattern specific to each communication method is used for this search. For example, the receiving station 1 performs, for every several communication methods, determination on whether or not there is a match between a bit string included in the physical header portion for synchronization and the method-specific patterns of the communication methods, and the like. When a communication method is detected through the search, the receiving station 1 performs demodulation processing on a physical data portion that follows the physical header portion for synchronization, using the detected communication method.

FIG. 1 shows a flow in which the receiving station 1 determines, in successive determination on a communication method that is performed using the physical header portion for synchronization, that the communication method of the wireless frame does not match the communication method A nor the communication method B, and then determines that the communication method of the wireless frame matches a communication method C, and thus the physical data portion is demodulated using the communication method C.

The transmission station 2 transmits a wireless frame of the communication method C. When detecting the top of the wireless frame, the receiving station 1 first determines whether or not the communication method of the wireless frame is the communication method A, using the bit string of a portion of the physical header portion for synchronization of the physical layer frame. This determination is performed through comparison with a method-specific pattern that includes a unique word of the communication method A. If it is determined that the communication method of the wireless frame is not the communication method A, the receiving station 1 determines whether or not the communication method of the wireless frame is the communication method B, using the bit string of a portion of the physical header portion for synchronization, the portion being received later than the bit string used for the determination of the communication method A. This determination is performed by comparison with a method-specific pattern that includes a unique word of the communication method B. If it is determined that the communication method of the wireless frame is not the communication method B, the receiving station 1 determines whether or not the communication method of the wireless frame is the communication method C, using the bit string of a portion of the physical header portion for synchronization, the portion being received later than the bit string used for the determination of the communication method B. This determination is performed through comparison with a method-specific pattern that includes a unique word of the communication method C. If it is determined that the communication method of the wireless frame is the communication method C, the receiving station 1 demodulates the physical data portion of the physical layer frame using the communication method C. The reason for successively performing determination in this manner is that the receiving operation cannot be performed using two or more different communication methods at the same time, even with the LPWA chip that copes with a plurality of communication methods.

In the case where there is no match to the method-specific pattern of any of the communication methods targeted for determination, the receiving station 1 fails in receiving the wireless frame. Specifically, the receiving station 1 determines that the receiving station 1 does not comply with the communication method of the wireless frame, or the receiving station 1 has received some form of signal, which is not a wireless frame. Note that there are cases where, if the number of communication methods that are candidates is large, the receiving station 1 cannot perform determination processing on all of those communication methods, using the physical header portion for synchronization of the same physical layer frame. In this case, the receiving station 1 performs determination processing on another communication method for which determination processing has not been performed, using the physical header portion for synchronization of a physical layer frame received at another timing.

Note that the receiving station 1 may dynamically change a time at which a bit string is obtained from the physical header portion for synchronization or the number of symbols that are obtained. That is to say, as a result of dynamically determining the time length of a bit string or the number of symbols that are obtained, based on one or more of the length of a unique word of a communication method targeted for determination, the symbol rate of a communication method targeted for determination, and the radio wave environment information, the receiving station 1 can efficiently detect the communication method. For example, the more unfavorable the radio wave environment is, in other words, the lower the SNR (Signal to Noise Ratio) in the environment is, the higher the bit string error probability becomes. In view of this, the lower the SNR in the environment is, the longer the receiving station 1 sets a time for which a bit string is obtained or the number of symbols that are obtained, such that a period of time in which matching determination is performed becomes longer, in order to more reliably perform determination on pattern matching of a unique word.

In terminal-initiative LPWA communication, upload communication may occur from a terminal at any timing. Therefore, there is demand that a GW shared by a plurality of LPWA methods perform determination on the wireless method and carry out demodulation processing as efficiently as possible. As a result of the GW operating similarly to the receiving station 1 in FIG. 1, it is possible to, immediately after detection of a wireless frame that arrives at any timing, perform determination on the communication method without accumulating the wireless frame, and perform demodulation processing on the data portion.

As a result of applying this embodiment to a LPWA chip, the number of communication methods that can be detected from a single wireless frame using one chip increases. That is to say, an operation of receiving wireless frames of a plurality of communication methods is available using one chip, and thus it is possible to increase the number of communication methods that can be accommodated in one LPWA chip that is used in a shared GW.

Figure 2:
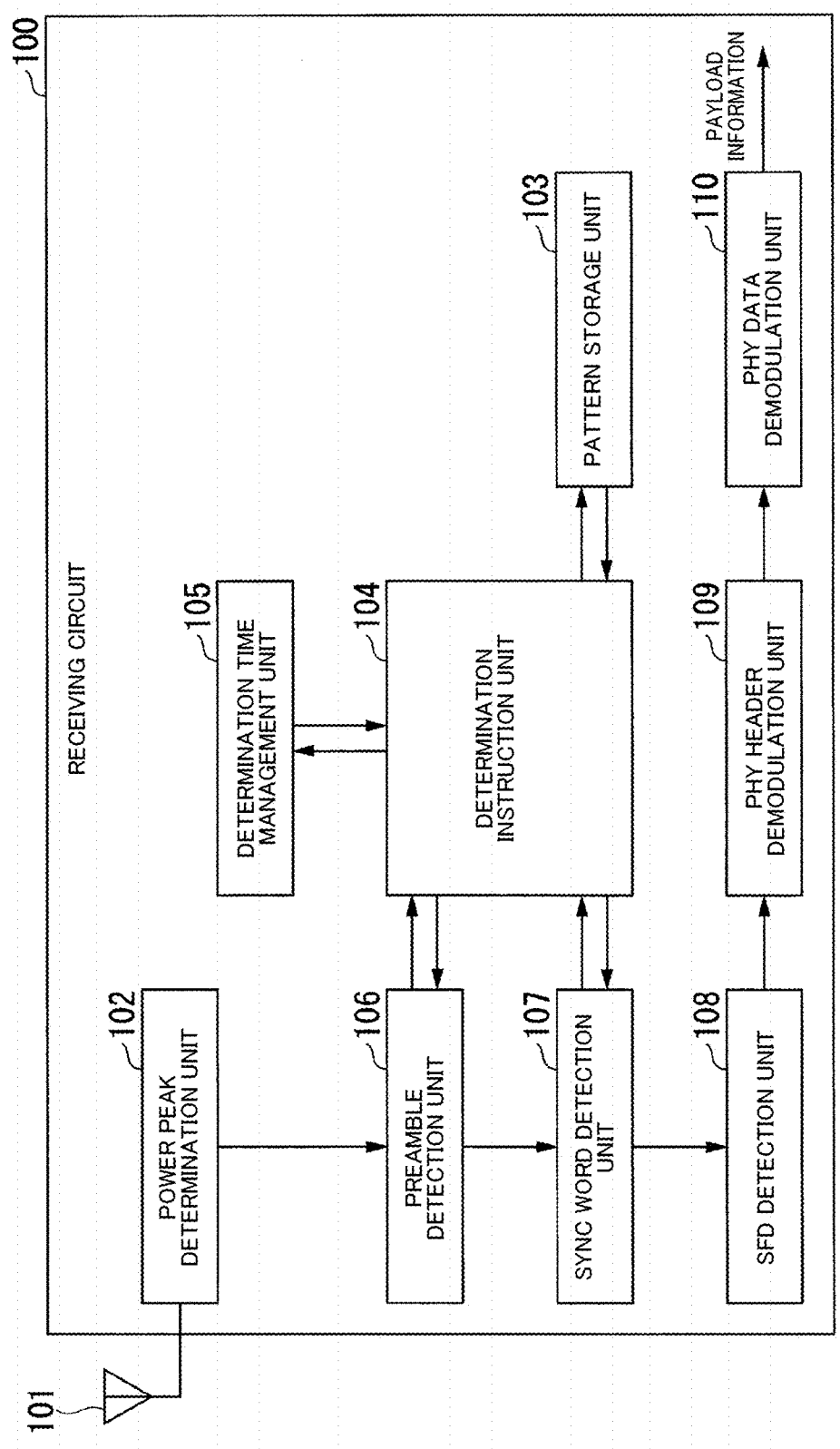
FIG. 2 is a diagram showing the configuration of a receiving circuit according to an embodiment of the present invention.
Figure 7:
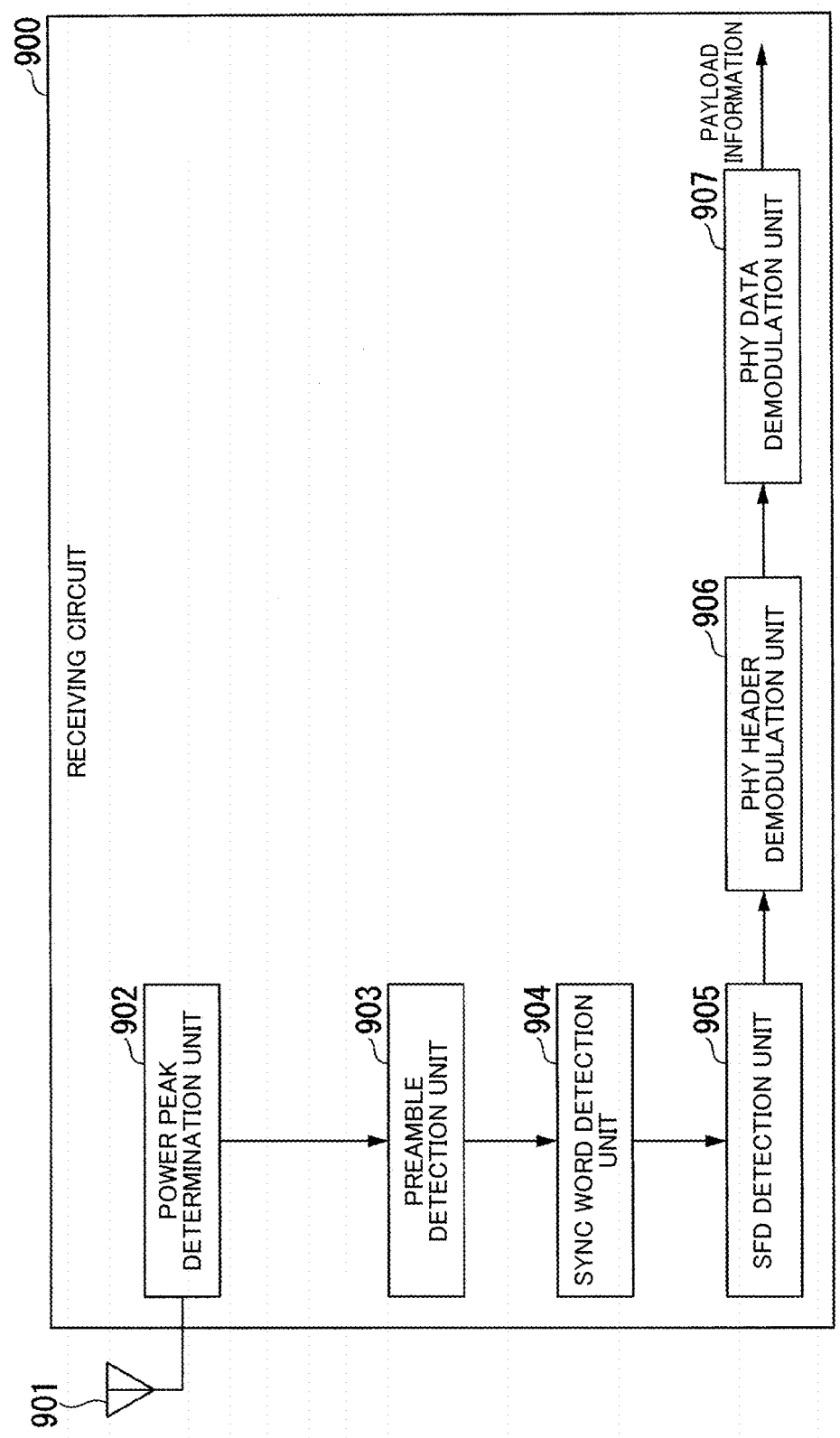
FIG. 7 is a diagram of the configuration of a conventional receiving circuit.
Figure 8:
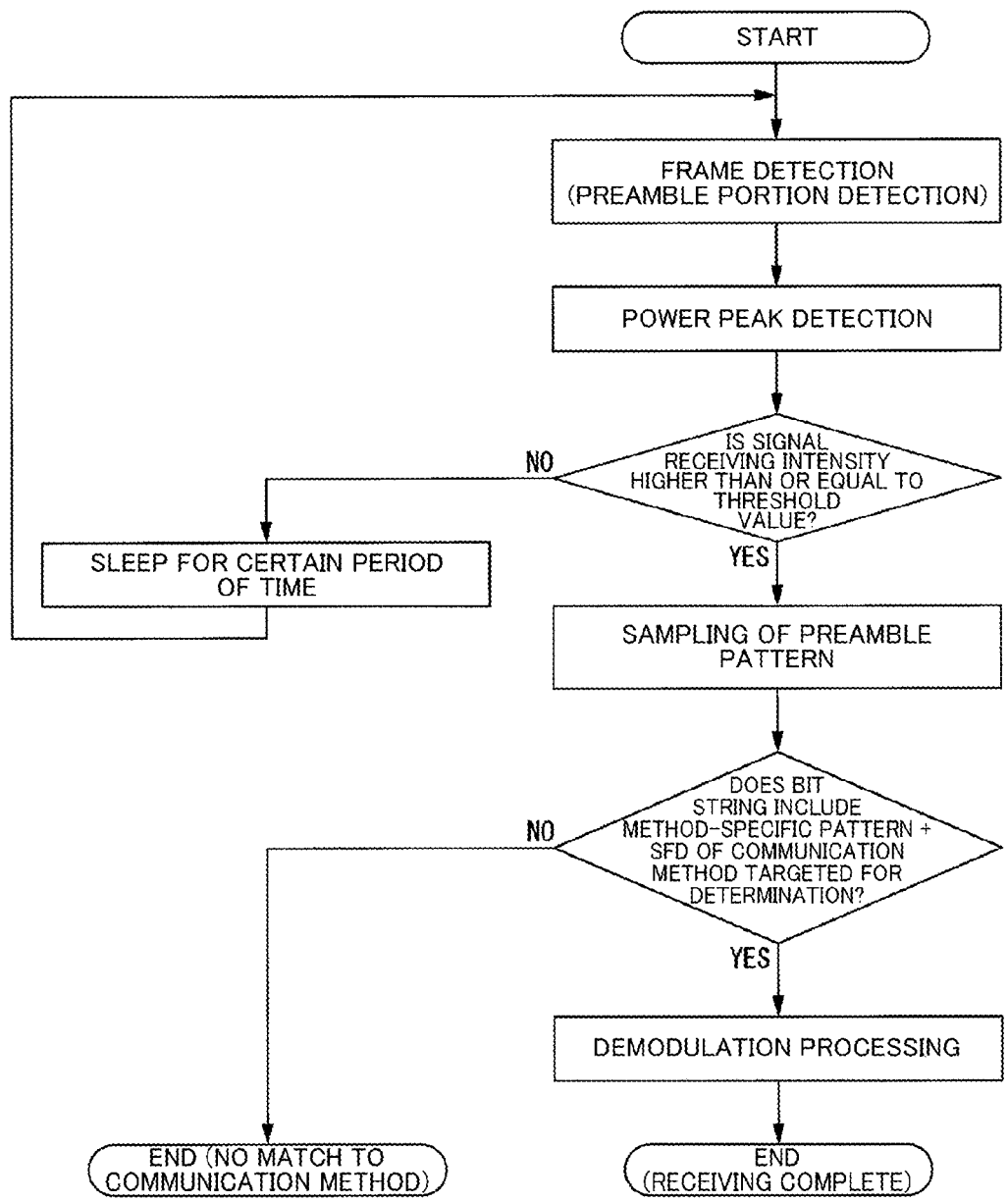
FIG. 8 is a flowchart of communication method determination processing of a conventional receiving circuit.
Figure 9:
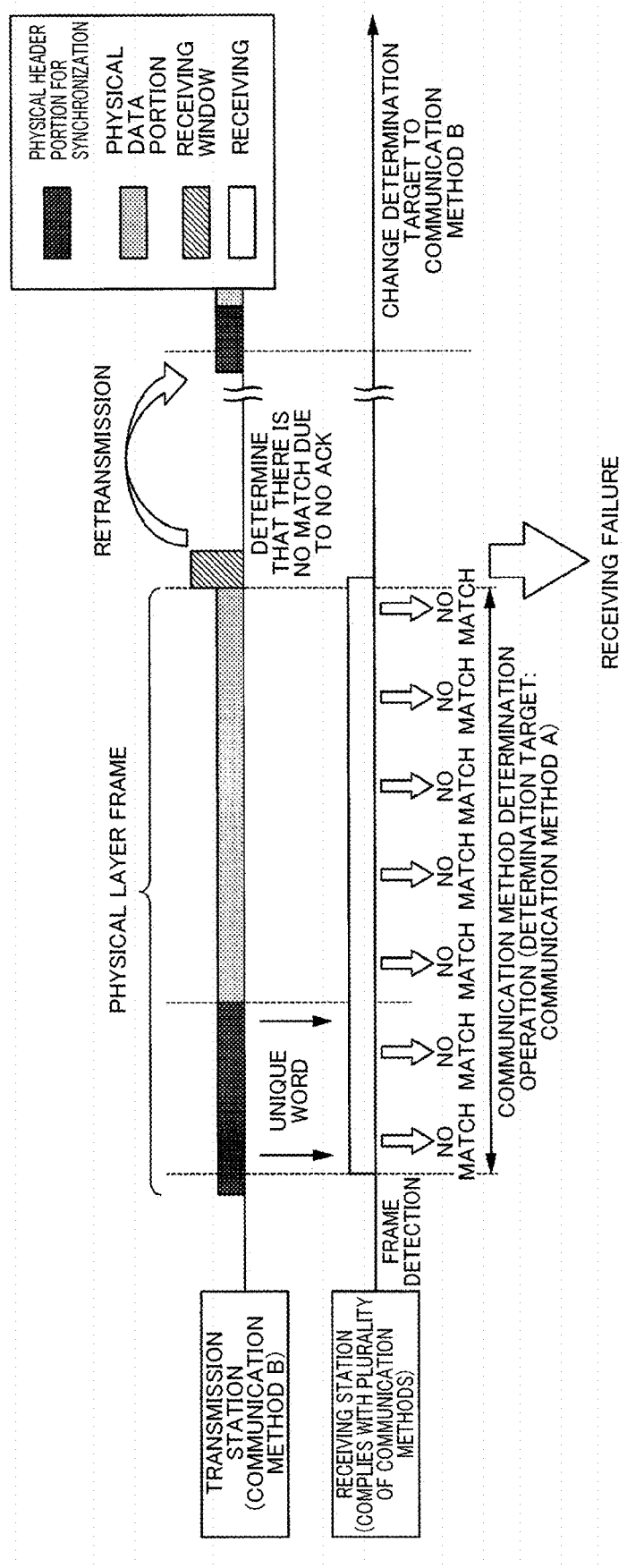
FIG. 9 is a diagram for illustrating operations of a conventional receiving station.
Figure 10:
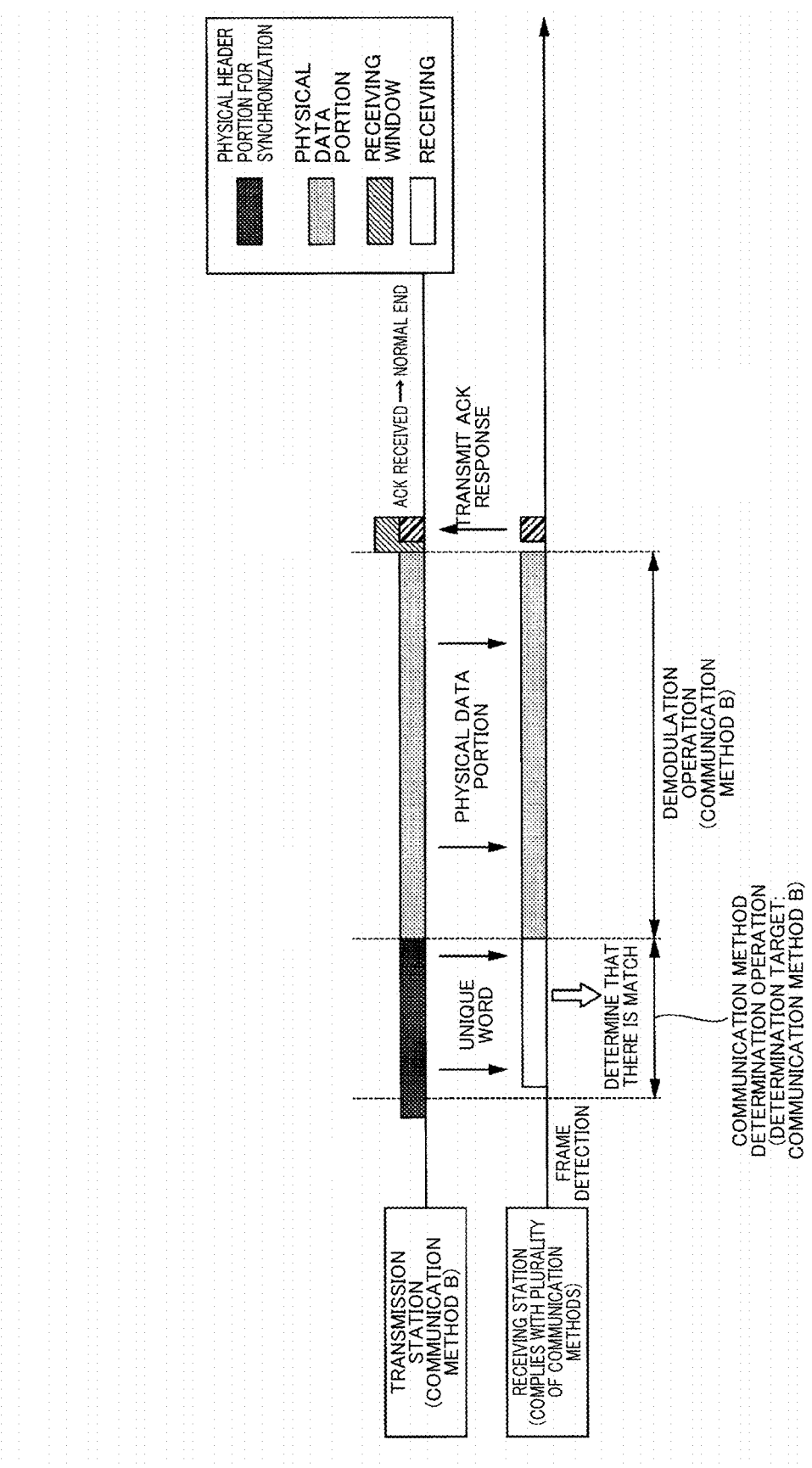
FIG. 10 is a diagram for illustrating operations of a conventional receiving station.

FIG. 2 is a diagram showing the configuration of a receiving circuit 100 according to an embodiment of the present invention. The receiving circuit 100 is an example of a communication method determination apparatus. The receiving circuit 100 is provided in the receiving station 1 shown in FIG. 1, for example. The receiving circuit 100 includes an antenna 101, a power peak determination unit 102, a pattern storage unit 103, a determination instruction unit 104, a determination time management unit 105, a preamble detection unit 106, a sync word detection unit 107, an SFD detection unit 108, a PHY header demodulation unit 109, and a PHY data demodulation unit 110. The antenna 101, the power peak determination unit 102, the SFD detection unit 108, the PHY header demodulation unit 109, and the PHY data demodulation unit 110 have functions that are respectively similar to those of the antenna 901, a power peak determination unit 902, the SFD detection unit 905, the PHY header demodulation unit 906, and the PHY data demodulation unit 907 in FIG. 7.

The power peak determination unit 102 detects receiving of a wireless frame based on wireless power received by the antenna 101. The pattern storage unit 103 stores method-specific patterns included in physical headers for synchronization for respective communication methods. The determination instruction unit 104 reads out the method-specific patterns of communication methods targeted for determination, from the pattern storage unit 103 in the order of determination to be performed. Each method-specific pattern includes a method-specific pattern of a preamble and a method-specific pattern of a sync word. The determination instruction unit 104 outputs the method-specific pattern of the preamble to the preamble detection unit 106, and outputs the method-specific pattern of the sync word to the sync word detection unit 107. The determination time management unit 105 sets, as a timing of the top, a time when the wireless frame was successfully detected, and instructs the determination instruction unit 104 on a time for performing determination processing for each communication method.

The preamble detection unit 106 obtains the bit string of a portion of the physical header for synchronization, and compares it with a method-specific pattern received from the determination instruction unit 104. The preamble detection unit 106 outputs the comparison result to the determination instruction unit 104. The sync word detection unit 107 obtains the bit string of a portion of the physical header for synchronization, and compares it with a method-specific pattern received from the determination instruction unit 104. The sync word detection unit 107 may obtain the bit string used by the preamble detection unit 106 for comparison with the method-specific pattern. The sync word detection unit 107 notifies the determination instruction unit 104 of the comparison result. The determination instruction unit 104 determines whether or not the wireless frame is a wireless frame of the communication method targeted for determination, based on the comparison results notified from the preamble detection unit 106 and the sync word detection unit 107.

The SFD detection unit 108 detects the SFD in the physical header portion for synchronization. The PHY header demodulation unit 109 demodulates the PHY header included in the physical data portion that follows the SFD. The PHY data demodulation unit 110 demodulates the PHY payload using the demodulation result of the PHY header.

Figure 3:
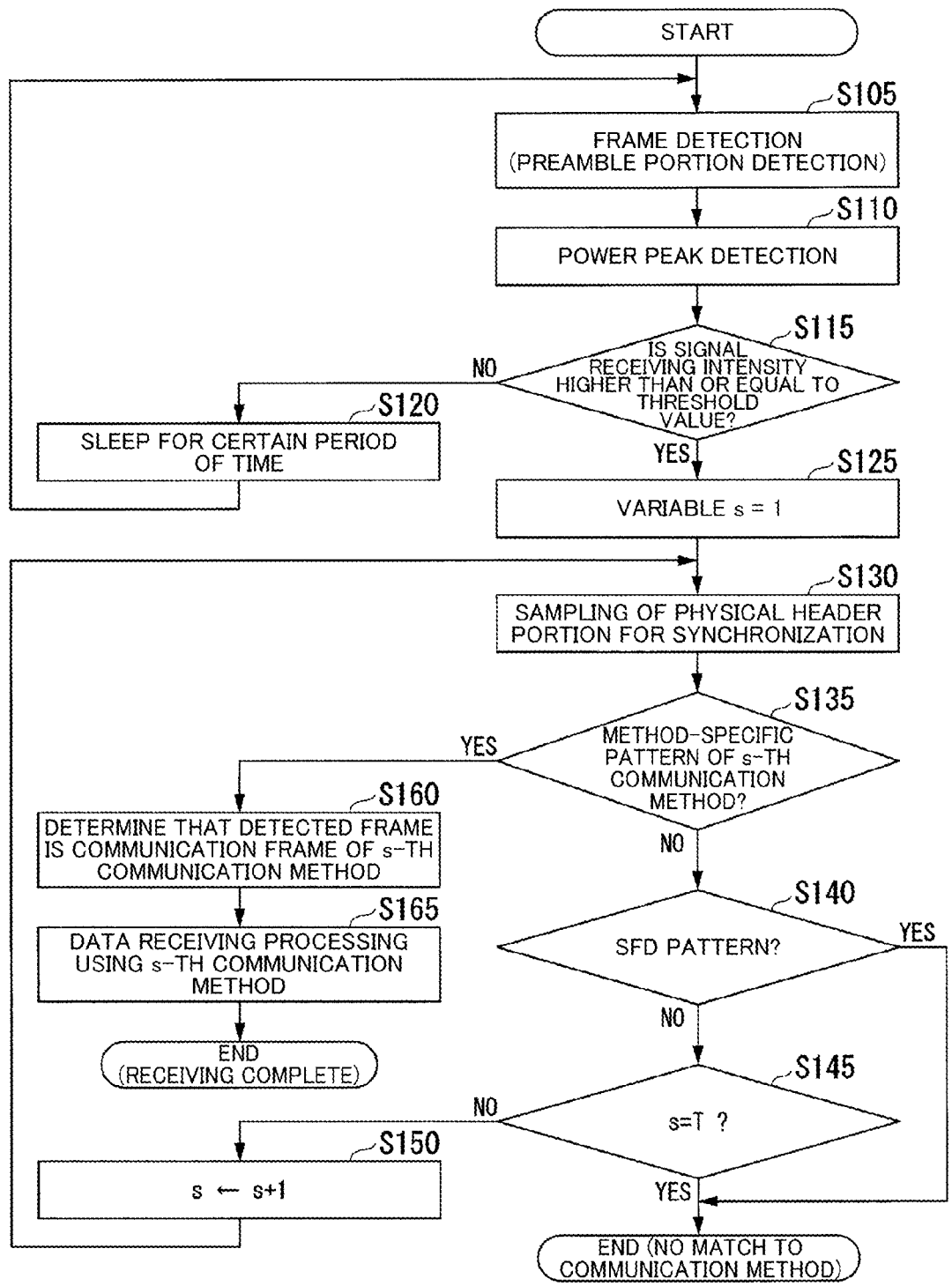
FIG. 3 is a flowchart showing communication method determination processing of a receiving circuit according to an embodiment of the present invention.

FIG. 3 is a flowchart showing communication method determination processing of the receiving circuit 100 shown in FIG. 2. The power peak determination unit 102 of the receiving circuit 100 detects receiving of a wireless frame based on wireless power received by the antenna 101 (step S105). A preamble portion is included at the top of the wireless frame. The power peak determination unit 102 detects the power peak of the received wireless frame (step S110). If the signal receiving intensity for the power peak is lower than a threshold value (step S115: NO), the receiving circuit 100 sleeps for a certain period of time (step S120).

On the other hand, if the signal receiving intensity for the power peak is higher than or equal to the threshold value (step S115: YES), the determination instruction unit 104 sets a variable s to 1 (step S125). The receiving circuit 100 samples a bit string for n bits from the physical header for synchronization (step S130). In view of this, first, the determination time management unit 105 instructs the determination instruction unit 104 on a period of time for performing determination processing of the s-th communication method. The determination instruction unit 104 instructs the preamble detection unit 106 to sample the physical header portion for synchronization for the period of time instructed from the determination time management unit 105. Accordingly, the preamble detection unit 106 samples a bit string for n bits from the physical header for synchronization of the wireless frame received by the antenna 101. The number of bits n that are sampled is smaller than or equal to the number of preamble bits N of the received wireless frame (n≤N).

The receiving circuit 100 determines whether or not the sampled bit string matches the method-specific pattern of the s-th communication method (step S135). For this determination, the determination instruction unit 104 reads out the method-specific pattern of the s-th communication method from the pattern storage unit 103. The determination instruction unit 104 outputs the method-specific pattern of the preamble to the preamble detection unit 106, and outputs the method-specific pattern of the sync word to the sync word detection unit 107. The preamble detection unit 106 outputs the result of comparison between the bit string sampled in step S130 and the method-specific pattern received from the determination instruction unit 104, to the determination instruction unit 104. Furthermore, the sync word detection unit 107 outputs the result of comparison between the bit string sampled in step S130 and the method-specific pattern received from the determination instruction unit 104, to the determination instruction unit 104. Note that the preamble detection unit 106 and the sync word detection unit 107 may determine that there is a match, not only when the sampled bit string and the method-specific pattern exactly match, but also when the hamming distance is within a predetermined value.

If both the comparison result of the preamble detection unit 106 and the comparison result of the sync word detection unit 107 indicate a mismatch to the method-specific patterns, the determination instruction unit 104 determines that the method-specific pattern of the s-th communication method has not been detected (step S135: NO). In this case, the SFD detection unit 108 determines whether or not the sampled bit string represents an SFD pattern (step S140). If the SFD detection unit 108 determines that the sampled bit string does not represent an SFD pattern (step S140: NO), the determination instruction unit 104 determines that scanning of the physical header for synchronization has not been completed yet.

The determination instruction unit 104 determines whether or not the variable s has reached the maximum number of communication methods T that the receiving circuit 100 complies with (step S145). If it is determined that the variable s has not reached the maximum number of communication methods T (step S145: NO), the determination instruction unit 104 adds 1 to the variable s (step S150). The receiving circuit 100 repeats processing in step S130 onward.

Specifically, the determination time management unit 105 instructs the determination instruction unit 104 on a time of period for performing determination processing of the s-th communication method. The determination instruction unit 104 instructs the preamble detection unit 106 to sample the physical header portion for synchronization for the time of period instructed from the determination time management unit 105. The preamble detection unit 106 samples a bit string for n bits from the physical header for synchronization of the wireless frame received by the antenna 101 (step S130). The determination instruction unit 104 reads out the method-specific pattern of the s-th communication method from the pattern storage unit 103, outputs the method-specific pattern of the preamble to the preamble detection unit 106, and outputs method-specific pattern of the sync word to the sync word detection unit 107. The preamble detection unit 106 outputs the result of comparison between the sampled bit string and the method-specific pattern of the preamble, to the determination instruction unit 104. The sync word detection unit 107 outputs the result of comparison between the sampled bit string and the method-specific pattern of the sync word, to the determination instruction unit 104.

If the comparison result of either the preamble detection unit 106 or the sync word detection unit 107 indicates a match to the method-specific pattern, the determination instruction unit 104 determines that the method-specific pattern of the s-th communication method has been detected (step S135: YES). The determination instruction unit 104 determines that the received wireless frame is a wireless frame of the s-th communication method (step S140). The receiving circuit 100 performs data receiving processing using the s-th communication method. That is to say, the SFD detection unit 108 detects an SFD, and the PHY header demodulation unit 109 demodulates the PHY header that follows the SFD. The PHY data demodulation unit 110 demodulates the PHY payload using the demodulation result of the PHY header.

Note that, if it is determined in step S145 that the variable s has reached the maximum number of communication methods T (step S145: YES), the determination instruction unit 104 determines that there is no match to the communication methods, and ends the processing in FIG. 3. In addition, if an SDF pattern is detected in step S140 (step S140: YES), the SFD detection unit 108 determines that scanning of the physical header for synchronization has been completed, and ends the processing in FIG. 3.

A specific example of communication method determination that is performed through the processing in FIG. 3 will be described. The receiving circuit 100 complies with three communication methods, namely the communication methods A, B, and C. The communication method A is "broadband 7", the communication method B is "EnOcean (registered trademark)", and the communication method C is "LoRa (registered trademark)". FIG. 4 is a diagram showing the specifications of these three communication methods A, B, and C. FIG. 4 shows, for each of the communication methods, the transfer rate, the names of the preamble, sync word, PHY header, and PHY payload that are used by the standard, bit string patterns of the preamble and sync word, and the time length of the sync word.

The antenna 101 of the receiving circuit 100 receives a wireless frame of an unknown communication method. The power peak determination unit 102 detects that a certain form of wireless frame has arrived, by detecting the power peak. The receiving circuit 100 samples the physical header portion for synchronization (the preamble, synchronization bits, and SFD). Note that, as shown in FIG. 4, the configuration and name of the physical header portion for synchronization may differ according to a communication method. However, if the wireless frame of the communication method targeted for detection has a portion from which a unique word that represents a unique (independent) bit string pattern can be extracted, substantially equivalent processing can be performed using any field of the physical header for synchronization.

In addition, a receiving station of a conventional technology processes the entire physical header portion for synchronization using a certain communication method set in the receiving station (or supported by a receiver), without stopping at a portion of the physical header portion for synchronization, and attempts demodulation. On the other hand, the receiving station according to this embodiment performs determination for a plurality of communication methods using a single wireless frame, by attempting matching to synchronization bits in the physical header for synchronization while successively switching a plurality of methods.

As shown in FIG. 4, a sample of a data series for first 4 bits, namely a portion of the sync word of the physical header for synchronization differs for each communication method. For example, if a sample of a bit string of a sync word obtained from a physical header portion for synchronization indicates "1001", the receiving circuit 100 can determine the communication method as "broadband 7", if the sample indicates "1010", the receiving circuit 100 can determine the communication method as "EnOcean", and, if the sample indicates "0011", the receiving circuit 100 can determine the communication method as "LoRa". When the communication method is determined, the receiving circuit 100 continuously receives the remaining physical header portion for synchronization that follows and performs demodulation processing of the physical data portion, using the determined communication method.

Next, a time during which a bit string is obtained from a physical header for synchronization, and that is managed by the determination time management unit 105, will be described.

"CAD (Channel Activity Detection)", for example, is stipulated for SX1272 manufactured by Semtech Corporation, which is a commercially available chip of LoRa that is one of the LPWA methods. This CAD is a function that can perform detection on a communication method and detection of a parameter based on the number of symbols of a preamble portion. CAD is described in a document "WIRE- LESS & SENSING PRODUCTS DATASHEET SX1272/73", Semitech Corporation, January 2019, pp. 40-42, for example.

Figures 5, 6:
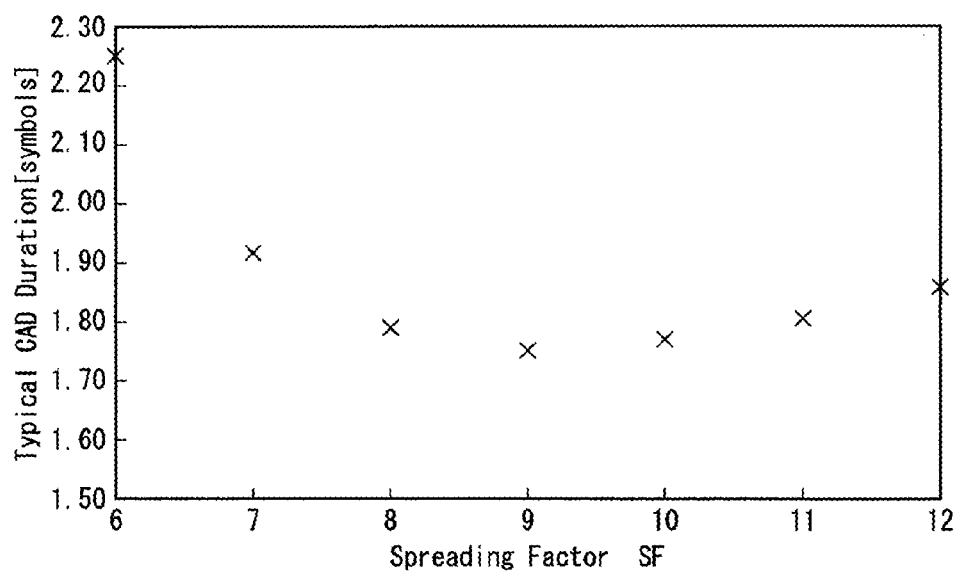
FIG. 5 is a diagram showing the number of LoRa symbols required for detecting a LoRa frame.
FIG. 6 is a diagram showing the structure of a physical layer frame of a wireless signal.

FIG. 5 is a diagram showing the number of LoRa symbols required for detecting a LoRa frame using the CAD function. FIG. 5 shows the relationship between the value of an SF (Spreading Factor) that is a modulation parameter and the typical value of the number of LoRa symbols required for detection of a LoRa frame using the CAD function. Note that the SF is determined mainly based on a symbol rate and a bandwidth.

In FIG. 5, CAD determination if SF=7 requires about 1.9 symbols, CAD determination if SF=8 requires about 1.8 symbols, and CAD determination if SF=9 requires about 1.8 symbols. The total number of symbols required for performing CAD determination for these three types of SFs is about 5.5 symbols. FIG. 5 shows typical values, and thus the number of symbols is a decimal number, but, for example, even when two symbols are used for each of these SFs in determination, it suffices for only six symbols in total to be used. On the other hand, as shown in FIG. 4, the preamble for LoRa includes 10 or more symbols, and the sync word includes 8 bits. Thus, if the SF is any number, the receiving circuit 100 can perform determination on the communication method and the SF through a trial for each of a plurality of, namely two or more SFs. Thus, the determination time management unit 105 instructs the determination instruction unit 104 on an obtaining time at which two symbols can be obtained at a time in the case of performing determination of the SF of LoRa=7, 8, or 9, or an obtaining time at which six symbols can be collectively obtained. The preamble detection unit 106, or the preamble detection unit 106 and the sync word detection unit 107 sample the physical header portion for synchronization at the obtaining time instructed from the determination instruction unit 104.

In addition, the receiving circuit 100 may attempt detection of not only the same LoRa but also a communication method other than LoRa, using the former half portion of the preamble, for example. If any communication method other than LoRa is not detected, the receiving circuit 100 suspends detection processing of such communication method due to time out at the time of a certain symbol length, and then performs detection of a communication method of LoRa again. Also in this case, as a result of using the CAD function, the receiving circuit 100 can detect one type of SF if there are about two symbols at most, and thus can detect different types of communication methods at the same time.

As described above, the receiving circuit 100 performs successive method detection processing for successively attempting detection on two or more different communication methods and modulation methods that are LPWA methods, using a portion of the physical header portion for synchronization. On the other hand, the transfer bit rate differs according to a communication method or a modulation method. That is to say, a time required for detecting a communication method or a modulation method differs according to the communication method or the modulation method. In view of this, in order to perform successive method detection processing using a portion of the physical header portion for synchronization, the determination time management unit 105 of the receiving circuit 100 dynamically sets a time at which detection of one communication method or modulation method is suspended due to timeout, according to a communication method or modulation method targeted for detection.

For example, the bit rates of the two communication methods, namely LoRa and broadband 7 are different as follows. In the case of LoRa modulation, SF=9, and bandwidth=125 kHz, the bit rate of LoRa is 1.7 kbps (kilobits per second). In addition, in the case of GFSK (Gaussian frequency shift keying) modulation and no encoding, the bit rate of broadband 7 is 50 kbps. In the cases of these communication methods, times required for reading 4 bits from the physical header portion for synchronization are respectively represented as Expressions 1 and 2 below.

LoRa: 4 bits/1.7 kbps=2.35 ms (1)

Broadband 7: 4 bits/50 kbps=0.08 ms (2)

Thus, in the case of LoRa, it is necessary to wait for 2.35 ms or longer until a determination is performed on whether or not there is a match to a bit string of 4 bits obtained from the physical header for synchronization, but, in the case of broadband 7, it suffices to wait for 0.08 ms or longer. In this manner, a minimum required time for obtaining a bit string from the physical header for synchronization differs according to a communication method. Thus, it is preferable to perform an operation by dynamically setting a time until communication method determination timeout, in order to realize efficient bit matching determination processing and superposition of a larger number of methods.

In addition, the determination instruction unit 104 may determine the order of communication methods targeted for determination, based on any information regarding the communication methods. For example, the determination instruction unit 104 can set the order of communication methods targeted for determination to the order of the highest detection determination speed. The ranking of the detection determination speeds of communication methods is obtained based on the characteristics of the physical layer frame designs and the symbol rates of communication methods. The characteristics of the physical layer frame design include a preamble length, the position of a unique word, and the like. For example, the detection determination speed of a communication method for which a preamble includes a bit string pattern different from another communication method can be deemed to be higher than a communication method that cannot be distinguished from another communication method based only on a preamble. In this manner, the closer the position of a unique word is to the top of a wireless frame, the higher the detection determination speed can be deemed. In addition, the shorter the length of a bit string pattern that is a unique word is, and the shorter the time length per symbol is, the higher the detection determination speed can be deemed.

In addition, the determination instruction unit 104 can set the detection order to the order of the communication method for which the probability of occurrence of communication is highest. The determination instruction unit 104 determines that the probability of occurrence of communication is high, based on the feature amount of a communication sequence before detection of a wireless frame.

There are cases where, for example, when the GW transmits data through download communication to a wireless machine using the communication method A, after this data communication normally ends, the wireless machine transmits an acknowledge ACK through upload communication using the communication method A. In addition, when a relatively large communication request (payload) addressed to a wireless machine is received from a higher-level network or the like, the GW performs fragmentation for dividing the request into a plurality of wireless frames, and transferring the divided communication request to the wireless machine. In this case, it can be predicted that wireless data frames of the communication method A will arrive at the wireless machine in a continuous manner, and ACK responses of the communication method A will arrive at the GW in a continuous manner. In addition, upload and download in these examples may be reversed. The determination instruction unit 104 increases the priority of a communication method used when data for which an acknowledge ACK is expected was transmitted and the priority of a communication method used when data was transmitted through fragmentation.

The following describes an example of a case where wireless frames of the same communication method continuously arrive. A GW wirelessly transmits a transfer request of sensor data to a wireless machine through IoT communication that uses LPWA. Assuming that the wireless machine transfers, to the GW, all sensor data indicating detection results of a sensor connected to the wireless machine, a relatively large-capacity band is required for transmission. Thus, the data amount of upload communication from the wireless machine to the GW and a higher-level server than the GW can be expected to be too large to be transferred using one wireless frame. In view of this, when the receiving station 1 that is a GW transmits a transfer request of sensor data to the transmission station 2 that is a wireless machine, the determination instruction unit 104 increases the priority of the communication method used when the transfer request was transmitted to the wireless machine.

As in these examples, if a communication method for which a wireless frame can arrive next can be predicted to a certain extent as prior information based on the feature amount of communication, the determination instruction unit 104 can change the detection order of communication methods based on the prediction.

In addition, the error rate of an information bit differs according to a radio wave environment. In view of this, the determination time management unit 105 dynamically sets a bit length required for communication method detection, based on radio wave environment information, and advances successive method detection processing of a plurality of communication methods that uses the physical header portion for synchronization. Consider performing determination on a communication method using first 4 bits that are a portion of a sync word, for example.

As shown in FIG. 4, if the first 4 bits of the sync word is "1001" ("bit string A"), the communication method can be determined as "broadband 7", and, if the first 4 bits of the sync word is "1010" ("bit string B"), the communication method can be determined as "EnOcean". The bit string A and the bit string B are different by 2 bits. Accordingly, the hamming distance between the bit string A and the bit string B is "2". Therefore, in a low-CNR (Carrier-to-Noise ratio) environment in which the BER (Bit Error Rate) is 0.5 or higher, in other words 2 bits out of 4 bits are erroneous, whether the communication method is "broadband 7" or "EnOcean" cannot be determined using only 4 bits. That is to say, in a CNR environment in which the bit string "1001" changes to a bit string "1010" due to two bits being erroneous, the sync word detection unit 107 mistakenly determines a signal of broadband 7 as a signal of EnOcean. In the case of such a low CNR, the sync word detection unit 107 obtains, from the sync word, a bit string that is longer than 4 bits, and determines whether or not there is a match to a method-specific pattern, thereby enabling the error rate of communication method determination to be improved.

Conversely, it is also conceivable that, in a very-high-CNR environment, as a result of obtaining the sync word from the top to the third bit thereof and determining whether or not there is a match to a method-specific pattern, it is possible to sufficiently perform communication method determination. That is to say, as a result of determining whether the first three bits of the sync word indicate "100" or "101", the sync word detection unit 107 can determine whether or not the communication method is broadband 7 or EnOcean. The same applies to a case where the preamble detection unit 106 performs determination using a method-specific pattern of a preamble. In this manner, it is preferable to dynamically set a bit length that is used for communication method determination, based on radio wave environment information that indicates the error rate of the information bit such as the CNR, and then perform operations.

In addition, the bit length that is used for communication method determination may be dynamically set based on the SNR. Consider, for example, a wireless communication system that can perform determination of the communication method A with the probability of about 80% when the physical header portion for synchronization is 64 bits and is larger than or equal to a certain SNR, and a match of 8 bits out of the 64 bits is recognized. There are cases where, when this wireless communication system is being operated with an SNR that is lower than or equal to a threshold value, the detection rate of 80% cannot be secured with a match of 8 bits of the method-specific pattern, and determination that there is a match of 12 or 16 bits is necessary to ensure the detection rate of 80%. In view of this, if the SNR is low, the determination time management unit 105 makes the determination time longer, and increases the bit length that is used for communication method determination.

In addition, as another example, consider a shared GW environment in which a determination can be performed on a communication method as a result of, in an operating environment in which the SNR is higher than or equal to the threshold value, determining that there is a match of at least 8 bits of the method-specific pattern of each of the communication method A and the communication method B, and determining that there is a match of at least 12 bits of the method-specific pattern of the communication method C. Here, if the symbol rates of the communication methods A, B, and C are different, the time length required for determining the minimum required number of bits differs for each of the communication methods. For example, assume that one bit corresponds to one symbol regarding all of the communication methods A, B, and C, and that the symbol rate of the communication method A is 100 bps (bits per second), the symbol rate of the communication method B is 50 bps, and the symbol rate of the communication method C is 80 bps. In this case, the time required for determination on the communication method A is 0.08 s (seconds), the time required for determination on the communication method B is 0.16 s, and the time required for determination on the communication method C is 0.15 s. In this manner, the determination time management unit 105 dynamically changes the determination time based on the symbol rate and the length of the method-specific pattern of each of the communication methods in addition to the SNR.

In addition, as described above, a time until the receiving station 1 detects certain n bits (n is a natural number) differs for each communication method depending on the symbol rate and the physical layer frame design such as the length of the physical header for synchronization and the positions from the top of the physical header for synchronization to the unique word. The determination time management unit 105 can change the priority of determination on each communication method based on the required time. The determination time management unit 105 determines the number of bits n required for determination, based on the communication environment of the SNR and the like and the communication method.

According to the embodiment described above, it is possible to efficiently perform determination on the communication method used for the received wireless frame.

According to the embodiment described above, a communication method determination apparatus includes a comparison unit and an instruction unit. The communication method determination apparatus is the receiving circuit 100, the comparison unit is the preamble detection unit 106 and the sync word detection unit 107, and the instruction unit is the determination instruction unit 104, for example. The comparison unit obtains a bit string of a portion of a physical header for synchronization from a wireless frame that includes the physical header for synchronization in which information for synchronization in a physical layer is set and a physical data portion in which data of a higher-level layer than the physical layer is set, and compares the obtained bit string with a bit string pattern specific to a communication method targeted for determination. The instruction unit performs communication method determination processing for determining whether or not the communication method targeted for determination is used for the wireless frame, based on a result of comparison performed by the comparison unit. If it is determined in the communication method determination processing that the communication method targeted for determination is not used for the wireless frame, the instruction unit changes the communication method targeted for determination to another communication method, and instructs the comparison unit to newly obtain a bit string of a portion that follows the obtained bit string, from the physical header for synchronization of the wireless frame, and to compare the newly obtained bit string with a bit string pattern specific to the post-change communication method targeted for determination. The instruction unit performs the communication method determination processing again based on the result of comparison performed by the comparison unit based on the instruction.

Accordingly, after the receiving station that complies with a plurality of wireless methods has successfully detected a wireless frame that arrived at a certain time, the communication method determination apparatus successively determines whether or not there is a match to a method-specific pattern that includes a unique word that is a bit string pattern specific to each of the plurality of communication methods, using the physical header portion for synchronization of the single wireless frame, and determines a communication method that is used for the wireless frame.

The communication method determination apparatus may also include a control unit. The control unit is the determination time management unit 105, for example. The control unit controls a length of time for which the comparison unit obtains the bit string from the physical header for synchronization of the wireless frame in order to perform comparison with a bit string pattern, according to the communication method targeted for determination. For example, the control unit uses, as a start point, a timing at which the receiving circuit successfully detected the wireless frame, to manage a time at which a bit string is obtained from the physical header for synchronization regarding a first communication method, the time having elapsed from the start point, and, if it is determined that there is no pattern match to the first communication method at the time, the control unit controls the instruction unit to determine whether or not there is a match to the next second communication method.

In addition, the control unit may control a time length for which the comparison unit obtains the bit string from the physical header for synchronization or the number of symbols that are obtained from the physical header for synchronization, based on a symbol rate of the communication method targeted for determination. Accordingly, the control unit dynamically changes the number of symbols or the time length required for determination on a communication method, in accordance with a detection situation, by taking advantage of the characteristics of the symbol rate that differs for each communication method. In addition, the control unit may change a time length for which the comparison unit obtains the bit string from the physical header for synchronization or the number of symbols that are obtained from the physical header for synchronization, based on radio wave environment information such as a CNR.

In addition, the instruction unit may determine an order of the communication methods targeted for detection, based on predetermined information regarding those communication methods. The predetermined information includes one or more out of a design of a physical layer frame of the communication method, the symbol rate of the communication method, and a probability of a wireless frame of the communication method being received. For example, the instruction unit may determine the order of communication methods targeted for detection as the order of the highest detection determination speed that is obtained based on the design of the physical layer frame of the communication method and the symbol rate of the communication method.

The functions of the receiving station 1 and the receiving circuit 100 according to the above embodiment may also be realized using a computer. In that case, the functions may also be realized by recording a program for realizing the functions in a computer-readable recording medium and causing a computer system to read and execute the program recorded in this recording medium. Note that the "computer system" referred to here includes an OS and hardware such as peripherals. Also, the "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, a program that can realize the aforementioned functions in combination with a program that has already been recorded in the computer system. In addition, all or some of the functions of the receiving station 1 and the receiving circuit 100 may also be realized using hardware such as ASIC (Application Specific Integrated Circuit), PLD (Programmable Logic Device), or FPGA (Field Programmable Gate Array).

Although the embodiments of the present invention have been described in detail with reference to the drawings, specific configurations are not limited to these embodiments, and design or the like made without departing from the gist of the present invention is also included in the scope of the present invention.

REFERENCE SIGNS LIST

1 Receiving station
2 Transmission station 100, 900 Receiving circuit
101, 901 Antenna
102, 902 Power peak determination unit
103 Pattern storage unit
104 Determination instruction unit
105 Determination time management unit
106, 903 Preamble detection unit
107, 904 Sync word detection unit
108, 905 SFD detection unit
109, 906 PHY header demodulation unit
110, 907 PHY data demodulation unit

The invention claimed is:

1. A communication method determination apparatus comprising:
   a processor; and
   a storage medium having computer program instructions stored thereon, when executed by the processor, perform to:
   obtain a bit string of a portion of a physical header for synchronization from a wireless frame that includes the physical header for synchronization in which information for synchronization in a physical layer is set and a physical data portion in which data of a higher-level layer than the physical layer is set, and compare the obtained bit string with a bit string pattern specific to a communication method targeted for determination; and
   perform communication method determination processing for determining whether or not the communication method targeted for determination is used for the wireless frame, based on a result of comparison performed by the comparison unit, and if it is determined in the communication method determination processing that the communication method targeted for determination is not used for the wireless frame, change the communication method targeted for determination to another communication method, instruct the comparison unit to newly obtain a bit string of a portion that follows the obtained bit string, from the physical header for synchronization of the wireless frame, and to compare the newly obtained bit string with a bit string pattern specific to the post-change communication method targeted for determination, and perform the communication method determination processing again.

2. The communication method determination apparatus according to claim 1, wherein the computer program instructions further perform to control a time length for which the comparison unit obtains the bit string from the physical header for synchronization according to the communication method targeted for determination.

3. The communication method determination apparatus according to claim 1, wherein the computer program instructions further perform to control a time length for which the comparison unit obtains the bit string from the physical header for synchronization or the number of symbols that are obtained from the physical header for synchronization, based on a symbol rate of the communication method.

4. The communication method determination apparatus according to claim 1, wherein the computer program instructions further perform to control a time length for which the comparison unit obtains the bit string from the physical header for synchronization or the number of symbols that are obtained from the physical header for synchronization, based on radio wave environment information.

5. The communication method determination apparatus according to claim 1, wherein the computer program instructions further perform to determines an order of the communication method targeted for determination, based on information regarding the communication method.

6. The communication method determination apparatus according to claim 5,
   wherein the information regarding the communication method includes one or more out of a design of a physical layer frame of the communication method, the symbol rate of the communication method, and a probability of a wireless frame of the communication method being received.

7. A non-transitory computer-readable medium having computer-executable instructions that, upon execution of the instructions by a processor of a computer, cause the computer to function as the communication method determination apparatus according to claim 1.

8. A communication method determination method comprising:
   a comparison step of obtaining a bit string of a portion of a physical header for synchronization from a wireless frame that includes the physical header for synchronization in which information for synchronization in a physical layer is set and a physical data portion in which data of a higher-level layer than the physical layer is set, and comparing the obtained bit string with a bit string pattern specific to a communication method targeted for determination;
   a communication method determination step of determining whether or not the communication method targeted for determination is used for the wireless frame, based on a result of comparison performed in the comparison step; and
   an instruction step of, if it is determined in the communication method determination step that the communication method targeted for determination is not used for the wireless frame, changing the communication method targeted for determination to another communication method, giving an instruction to newly obtain a bit string of a portion that follows the bit string obtained in the comparison step, from the physical header for synchronization of the wireless frame, and to compare the newly obtained bit string with a bit string pattern specific to the post-change communication method targeted for determination, and performing communication method determination step again.

* * * * *